United States Patent [19]

McSherry

[11] 3,939,597

[45] Feb. 24, 1976

[54] CRAB OR FISH TRAP

[75] Inventor: Thomas McSherry, Bayport, N.Y.

[73] Assignee: Woodstream Corporation, Lititz, Pa.

[22] Filed: Dec. 11, 1974

[21] Appl. No.: 531,776

[52] U.S. Cl. .............................................. 43/105
[51] Int. Cl.² ........................................ A01K 69/10
[58] Field of Search ................ 43/105, 102, 100, 63

[56] References Cited
UNITED STATES PATENTS

| 113,292 | 4/1871 | Hammond | 43/105 |
| 1,161,186 | 11/1915 | Butcher | 43/105 |
| 2,911,755 | 11/1959 | Rabin | 43/105 |

FOREIGN PATENTS OR APPLICATIONS

| 1,010,224 | 11/1965 | United Kingdom | 43/105 |

Primary Examiner—Warner H. Camp
Attorney, Agent, or Firm—Holman & Stern

[57] ABSTRACT

A crab or fish trap being made of a pair of cooperating mating halves pivotally joined together, each half generally being of a triangular prismatic shape and made of a mesh material.

6 Claims, 3 Drawing Figures

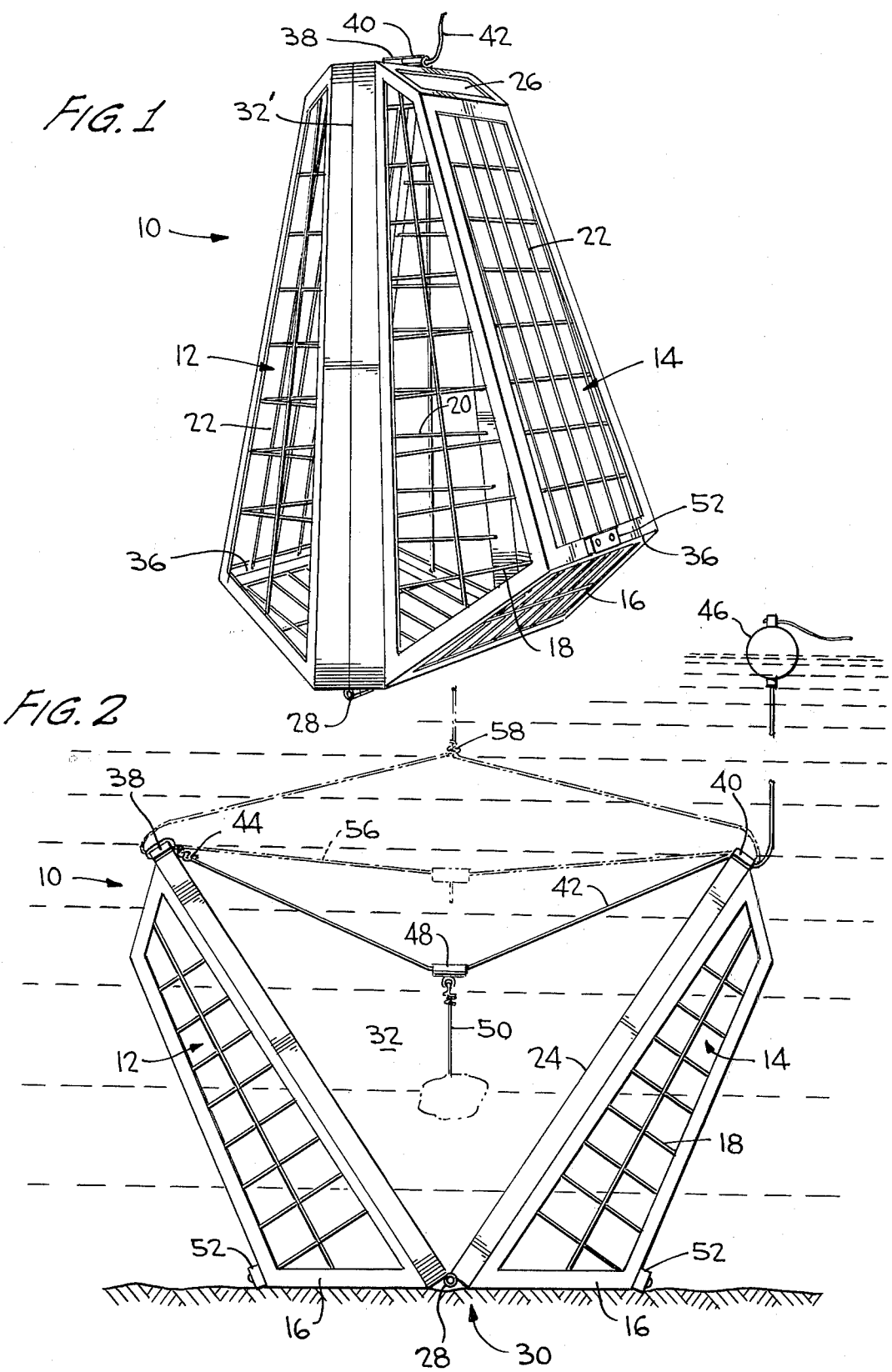

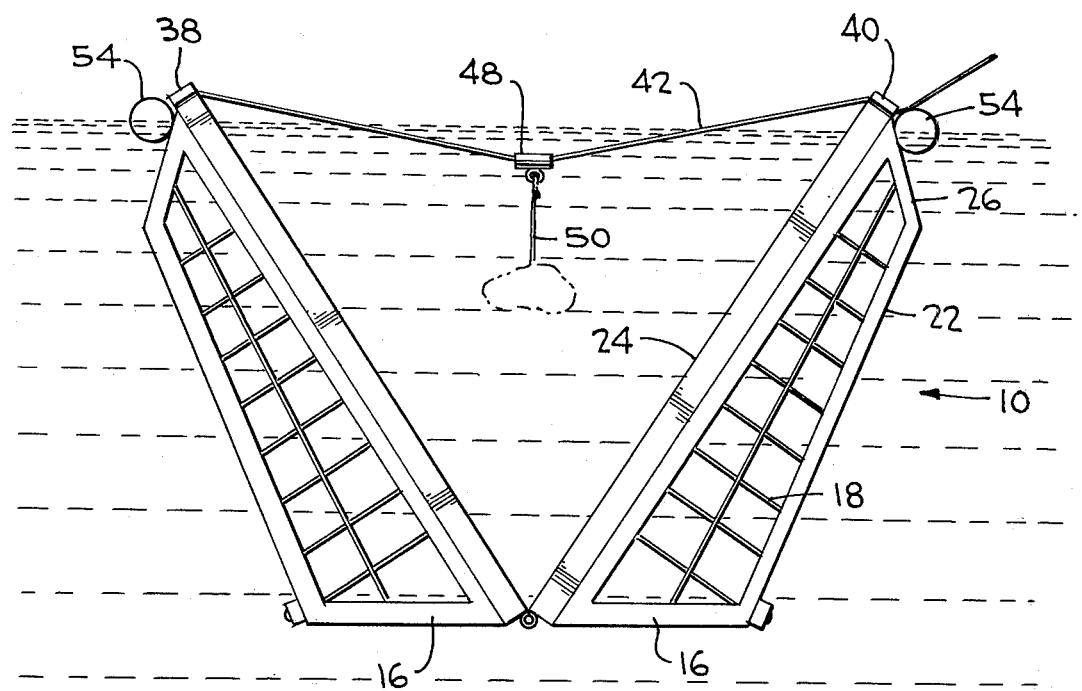

CRAB OR FISH TRAP

BACKGROUND OF THE INVENTION

Various types of crab or fish traps have been proposed in the prior art over the years. Such traps usually comprise two sections hinged so that they can be disposed in an open position and then closed when the crab or fish has entered the space between the two halves. Their general configuration has been spherical such as in U.S. Pat. No. 237,231, dated Feb. 1, 1881; clam shell-shaped such as in U.S. Pat. No. 708,380, dated Sept. 2, 1902; or any one of a number of other odd shapes such as in U.S. Pat. No. 1,161,186, dated Nov. 23, 1915, or U.S. Pat. No. 113,292, dated Apr. 4, 1971. Furthermore, regardless of shape, such traps are often made in a collapsable manner such as U.S. Pat. Nos. 1,262,507, dated Apr. 9, 1918, 2,603,031, dated July 15, 1952, or 3,553,881, dated Jan. 12, 1971. Each of these constructions suffers from one or more disadvantages in use. The prime disadvantage of most of these prior art traps is that it is slow and difficult to close and, because of this, the fish or crab within the trap may escape before its means of egress is closed off. Furthermore, traps such as that shown in Hammond Pat. No. 113,292 dated Apr. 4, 1871, are top heavy and relatively unstable so that when they are set they tend to land on one side or another without opening. In this regard, it should be kept in mind that the usual method of setting these traps is merely to throw the trap over board from a boat and allow it to settle to the bottom of the body of water where, hopefully, when it lands it will land in an upright position and open.

SUMMARY OF THE INVENTION

It is therefore, a primary object of the present invention to provide a crab or fish trap which is free of the aforementioned and other such disadvantages.

It is another object of the present invention to provide a crab or fish trap which is stable and will always set in an upright position.

It is still another object of the present invention to provide a crab or fish trap which will move from the opened to the closed position quickly and easily without allowing crabs or fish to escape.

It is yet another object of the present invention to provide a crab or fish trap which is easily and inexpensively manufactured.

It is a further object of the present invention to provide a crab or fish trap which is easily set and easily retrieved.

Consistent with the foregoing objects, the crab or fish trap of the present invention comprises a pair of complementary compartment half members, each said member comprising a mesh structure generally defining a triangular prism having a base, two opposed triangular end faces, a rear face, and an open front face, said front and rear faces being substantially larger than said base; hinge means joining said members at the edge joining said base and said front face such that when the trap is in a closed position the respective front faces are juxtaposed in a mating relationship to thereby form an enclosed compartment, and when the trap is in an open position said bases of said compartment half members form a substantially planar trap base and said front faces are spaced apart to allow ingress of a crab or fish; and means for moving said members to the opened or closed positions.

BRIEF DESCRIPTION OF THE DRAWINGS

This invention will be better understood and objects other than those set forth above will become apparent when consideration is given to the following detailed description thereof. Such description makes reference to the annexed drawings wherein:

FIG. 1 is a perspective view of the trap of the present invention in the closed position;

FIG. 2 is a vertical elevation of the trap of the present invention in the opened position; and FIG. 3 is a vertical elevation of the trap of FIG. 2 in another embodiment.

Like reference characters refer to like parts throughout the several views of the drawings.

DESCRIPTION OF THE PREFERRED EMBODIMENTS

Considering the crab or fish trap of the present invention in its broadest concept, it comprises a pair of complementary compartment half members, hinge means joining the members, and means for opening and closing the trap. Each of the compartment half members comprises a mesh structure generally defining an essentially triangular prism having a base, two opposed essentially triangular end faces, a rear face, and an open front face, with the front and rear faces being substantially larger than the base. The hinge means joins the two members at the edge joining the base and the front face so that the front faces will juxtapose in a mating relationship when the trap is closed. Yet, when the trap is open, the bases of the two members form a substantially planar trap base with the front faces being spaced apart. In a preferred embodiment, the triangular prismatic shape is truncated so that a top face is also provided.

In the most preferred embodiment, the end faces are angled slightly inwardly so that it could be said that each compartment half member defines a truncated oblique rectangular pyramid. Turning now to FIGS. 1 and 2, it will be seen that the crab or fish trap in the most preferred embodiment, generally designated by the numeral 10, comprises a pair of compartment half members 12 and 14. Each compartment half member 12 and 14 comprises a mesh structure generally defining a truncated oblique rectangular pyramid having a trapezoidal base 16, two opposed trapezoidal end faces 18 and 20, a trapezoidal rear face 22, an open trapezoidal front face 24, and a frustum defining a trapezoidal top face 26. As can be seen, front and rear faces 22 and 24 are substantially larger than base 16. Hinge means 28 joins the two members 12 and 14, the hinge means 28 running transversely across the edge joining base 16 and front face 24. Thus, it will be appreciated that due to this novel construction, when the trap 10 is set it will automatically open and land in the position shown in FIG. 2 with the two bases 16 forming a substantially planar trap base generally designated as 30. The rear faces 22 will stand upwardly and outwardly so that an open area shown at 32 will be provided for ingress of the fish or crab. In the case of crab or bottom fish such as flounder, it will be appreciated that the fish or crab will remain at the bottom of the trap so that when the trap is closed the area separating the front faces 24 at the lower end thereof will be immediately shortened and closed since it has a very short distance to travel and the fish or crab will not be able to scuttle out. When the trap is closed, the open front faces 24 will juxtapose and mate as shown at 32'. The two compartment half members 12 and 14 then form an enclosed compartment entrapping the fish or crab. It will also be appreciated that a large volume is defined by that part of the trap 10 lying below the plane passing through the edges 36 where the bases 16 and rear faces 22 meet. This provides for the greater trapping capability and quick closing of the trap as well as for the sure opening and placement of the trap since the center of gravity is relatively low. The means for closing the trap comprises a pair of ring members 38 and 40 located at the top of each of the compartment half members and a line 42 arranged in such a way that when the line is pulled, the two compartment half members will come together. As shown in FIG. 2, this is accomplished by fixedly securing line 42 to ring member 38 simply by tying a knot 44, and allowing line 42 to slide freely through loop 40. Thus, when line 42 is pulled from the surface, it will slide through ring 40 and bring the two compartment half members 12 and 14 together as they are lifted. Of course, a float 46 is secured to the opposite end of line 42 to act as a buoy. Also, means for holding bait within the trap could comprise a slide 48 freely moving on line 42 and a leader 50 depending from slide 48. A hook or other suitable bait-holding means is secured to the lower end of the leader 50.

Trap 10 may be fabricated of any suitable material and, in its most basic form, could comprise a frame with a mesh attached thereto. In the preferred form, however, the trap 10 is fabricated of any suitable plastic such as polyethylene, polypropylene, polystyrene, polyvinylchloride, or the like and is made by any of the well-known molding or extrusion methods. Thus, the frame and the mesh are integral. Furthermore, the hinge means 28 can be molded integrally with the body of the trap 10 or can be applied separately. Furthermore, in the most preferred embodiment, a pair of lead weights 52 are provided in order to overcome the natural buoyancy of the trap and allow it to rapidly sink to the bottom of the body of water. The lead weights 52 also ensure rapid opening of the trap when it is set and ensure that the trap cannot be tipped over.

Attention is now directed to FIG. 3 wherein the trap 10 is shown with floats 54 affixed to the upper portion of the trap so that the trap, when set, will float just below the surface of the water in the open position and will, therefore, be suitable for trapping fish of a type that swim near the surface of the water.

Alternate means for closing the trap can include, for example, a line 56 shown in phantom in FIG. 2 freely sliding through both loops 38 and 40 and forming a closed loop with one end of line 56 knotted at 58 about the main portion of the line. Thus, when the line 58 is pulled upwardly, the trap will close and rise at the same time.

Still another embodiment which is not illustrated is the use of this trap as a chumpot, this being accomplished merely by using a fine mesh to enclose the trap rather than the coarse mesh which would ordinarily be used for catching crabs or larger fish.

It should be apparent from the foregoing detailed description that the objects set forth hereinabove have been successfully achieved. Moreover, while there is shown and described present preferred embodiments of the invention, it is to be distinctly understood that the invention is not limited thereto but may be otherwise variously embodied and practiced within the scope of the following claims. Accordingly,

What is claimed is:

1. A crab or fish trap comprising a pair of compartment half members, each said member comprising a mesh structure generally defining a truncated oblique rectangular pyramid having a trapezoidal base, two opposed trapezoidal end faces, a trapezoidal rear face, an open trapezoidal front face, and a frustum defining a trapezoidal top face, said front and rear faces being substantially larger than said base; hinge means joining said members at the edge joining said base and said front face such that when said trap is in a closed position the respective front faces are juxtaposed in a mating relationship to thereby form an enclosed compartment, and when said trap is in an open position said bases of said compartment half members form a substantially planar trap base and said front faces are spaced apart to allow ingress of a crab or fish; and means for moving said members to the opened or closed positions.

2. A trap as defined in claim 1, further comprising weights secured to each said compartment half member at the edge joining said rear face and said base.

3. A trap as defined in claim 1, further including means for holding bait within the area between said front faces.

4. A trap as defined in claim 1, wherein means for moving said members comprises a ring at the top of each compartment half member and a line cooperating with said rings to thereby close said trap when said line is pulled.

5. A trap as defined in claim 1, further comprising a plurality of floats affixed to the top of each compartment half member to thereby enable said trap to float near the surface of a body of water.

6. A trap as defined in claim 1, wherein said mesh is of a fine gauge.

* * * * *